United States Patent
Seo et al.

(10) Patent No.: US 9,652,193 B2
(45) Date of Patent: May 16, 2017

(54) METHOD AND APPARATUS FOR PROVIDING SERVICE BY USING SCREEN MIRRORING

(71) Applicant: Samsung Electronics Co., Ltd., Suwon-si, Gyeonggi-do (KR)

(72) Inventors: Ji-hwan Seo, Suwon-si (KR); Pil-seob Kang, Suwon-si (KR); Soo-ho Chang, Seoul (KR); Seong-il Hahm, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 14/473,176

(22) Filed: Aug. 29, 2014

(65) Prior Publication Data

US 2015/0061972 A1     Mar. 5, 2015

(30) Foreign Application Priority Data

Sep. 2, 2013   (KR) .......................... 10-2013-0105101

(51) Int. Cl.
  *G06F 3/14*     (2006.01)
  *G06F 3/0488*   (2013.01)
  (Continued)

(52) U.S. Cl.
  CPC .............. *G06F 3/14* (2013.01); *G06F 3/0488* (2013.01); *G06F 3/04817* (2013.01); *H04M 1/7253* (2013.01); *H04N 21/4122* (2013.01); *G06F 2203/04803* (2013.01); *H04M 2250/22* (2013.01)

(58) Field of Classification Search
  CPC ........ G06F 3/14; G06F 3/0488; G06F 3/0481; G06F 3/04817; G06F 15/16; G06F 3/048; G06F 3/1454; G06F 9/455; H04N 21/4122; H04N 7/16; H04M 1/7253; G09G 2370/06; G09G 2370/10; G09G 2370/16
  See application file for complete search history.

(56) References Cited

U.S. PATENT DOCUMENTS 9,471,269 B2 * 10/2016 Dunn .................... G06F 3/1454
2007/0150924 A1   6/2007 Ichinose et al.
(Continued)

FOREIGN PATENT DOCUMENTS

EP   2 178 282 A1   4/2010
EP   2 242 240 A1   10/2010
(Continued)

*Primary Examiner* — Jennifer Mehmood
*Assistant Examiner* — Sardis F Azongha
(74) *Attorney, Agent, or Firm* — Jefferson IP Law, LLP

(57) ABSTRACT

A method for providing a service related to a plurality of mirroring images displayed on a screen of a sink device is provided. The method includes determining a first object in a first mirroring image that is displayed on the screen of the sink device, based on a user input, as the first object is moved to a location in a second mirroring image that is displayed on the screen of the sink device, determining a second object that corresponds to the location to which the first object has been moved, determining a service related to the first object and the second object, from among services provided via the second mirroring image, and outputting a result of the determined service.

20 Claims, 16 Drawing Sheets

(51) Int. Cl.
*H04M 1/725* (2006.01)
*G06F 3/0481* (2013.01)
*H04N 21/41* (2011.01)

(56) References Cited

U.S. PATENT DOCUMENTS

| | | | |
|---|---|---|---|
| 2010/0099456 A1* | 4/2010 | Kim | G06F 3/0346 |
| | | | 455/556.1 |
| 2010/0262673 A1* | 10/2010 | Chang | G06F 3/1454 |
| | | | 709/217 |
| 2011/0231791 A1 | 9/2011 | Itahana | |
| 2012/0262494 A1* | 10/2012 | Choi | G06F 3/0481 |
| | | | 345/672 |
| 2012/0290943 A1 | 11/2012 | Toney et al. | |
| 2013/0033435 A1* | 2/2013 | Raveendran | G06F 3/0481 |
| | | | 345/173 |
| 2013/0138728 A1 | 5/2013 | Kim et al. | |
| 2013/0162502 A1 | 6/2013 | Lee et al. | |
| 2013/0210488 A1* | 8/2013 | Lee | G06F 3/14 |
| | | | 455/557 |
| 2013/0278484 A1* | 10/2013 | Hwang | G06F 3/1423 |
| | | | 345/2.3 |
| 2014/0002389 A1* | 1/2014 | Kim | G06F 3/1446 |
| | | | 345/173 |
| 2014/0009394 A1* | 1/2014 | Lee | H04N 5/4403 |
| | | | 345/157 |
| 2014/0306865 A1* | 10/2014 | Pan | G06F 3/1423 |
| | | | 345/2.1 |

FOREIGN PATENT DOCUMENTS

| | | |
|---|---|---|
| EP | 2 629 193 A2 | 8/2013 |
| JP | 2007-156886 A | 6/2007 |

* cited by examiner

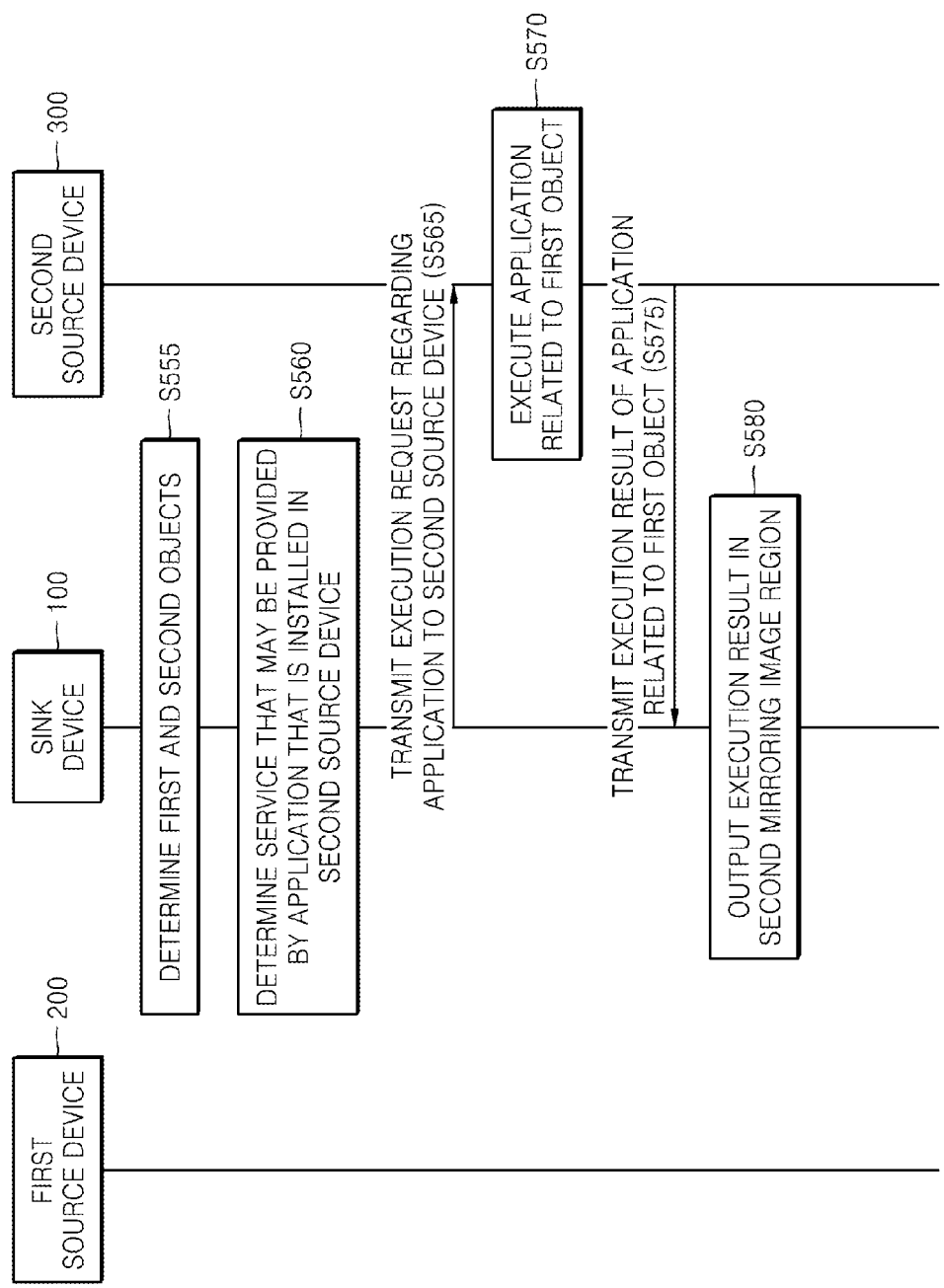

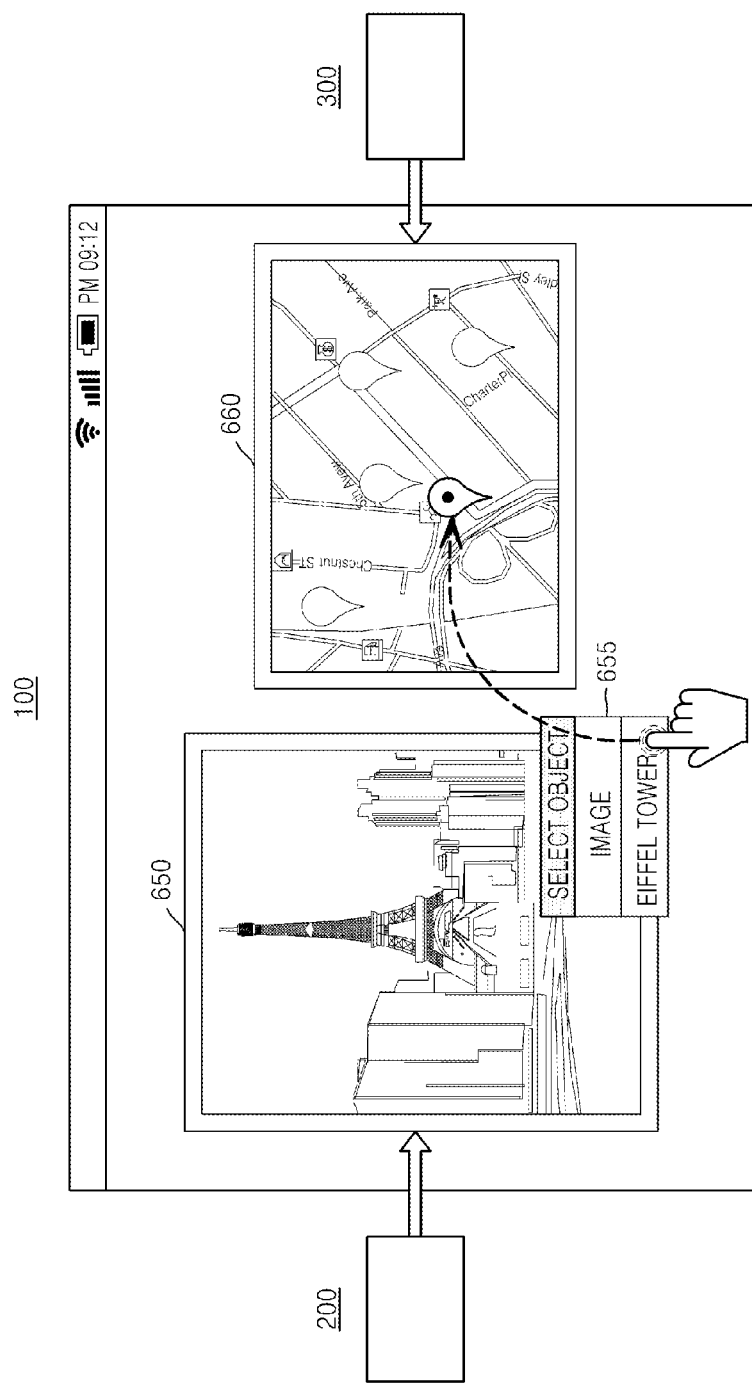

METHOD AND APPARATUS FOR PROVIDING SERVICE BY USING SCREEN MIRRORING

CROSS-REFERENCE TO RELATED APPLICATION(S)

This application claims the benefit under 35 U.S.C. §119 (a) of a Korean patent application filed on Sep. 2, 2013 in the Korean Intellectual Property Office and assigned Serial No. 10-2013-0105101, the entire disclosure of which is hereby incorporated by reference.

TECHNICAL FIELD

The present disclosure relates to a method and apparatus for providing a service by using screen mirroring. More particularly, the present disclosure relates to a method and apparatus for providing a service by using information shown in a plurality of mirroring images.

BACKGROUND

Mirroring technology allows a plurality of apparatuses to share and operate data that is output on multiple screens. For example, when a user of a tablet is downloading and streaming a movie and the mirroring technology is used, the movie may be reproduced on a TV, such as in a living room.

Mirroring technology is rapidly being developed as a technology for connecting apparatuses, such as Wi-Fi Direct, which may be applied to all types of electronic devices that are capable of outputting a screen on a display, such as smartphones, tablets, laptops, TVs, game consoles, and the like.

In general, mirroring apparatuses are capable of transmitting not only video data or audio data, but also control data for interactively controlling mirroring apparatuses_mutually. However, the mirroring apparatuses are only being used for transmitting information that is input by a keyboard, a mouse or a touch input.

Therefore, when using the mirror technology, a user may be unable to directly interact with information shown on a mirroring screen. In addition, when displaying a plurality of mirrored images on a single device, a user may be unable to directly interact with information shown on the plurality of mirrored images.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for providing a service related to a plurality of mirroring images.

Additional aspects will be set forth in part in the description which follows and, in part, will be apparent from the description, or may be learned by practice of the presented embodiments.

In accordance with an aspect of the present disclosure, a method of providing a service related to a plurality of mirroring images that are displayed on a screen of a sink device is provided. The method includes determining a first object in a first mirroring image that is displayed on the screen of the sink device, based on a user input, as the first object is moved to a location in a second mirroring image that is displayed on the screen of the sink device, determining a second object that corresponds to the location to which the first object has been moved, determining a service related to the first object and the second object, from among services provided via the second mirroring image, and outputting a result of the determined service.

In accordance with an aspect of the present disclosure, a sink device for providing a service related to a plurality of mirroring images that are displayed on a screen is provided. The sink device includes a memory configured to store at least one program, and a processor configured to execute the at least one program so as to display an execution result, wherein the at least one program comprises commands that execute determining a first object in a first mirroring image that is displayed on the screen of the sink device, based on a user input, as the first object is moved to a location in a second mirroring image that is displayed on the screen of the sink device, determining a second object that corresponds to the location to which the first object has been moved, determining a service related to the first object and the second object, from among services provided via the second mirroring image, and outputting a result of the determined service.

In accordance with an aspect of the present disclosure, a method of providing a mirroring service to a sink device is provided. The method includes receiving, from the sink device, information regarding an object, information regarding an application, and a mirroring request regarding an execution result of the application, wherein the application is executed based on the information regarding the object, and mirroring the execution result of the application onto the sink device.

In accordance with an aspect of the present disclosure, a source device for providing a mirroring service is provided. The source device includes a communication unit configured to communicate with an external device, a memory configured to store at least one program, and a processor configured to execute the at least one program so as to display an execution result, wherein the at least one program comprises commands for, receiving, from a sink device via the communication unit, information regarding an object, information regarding an application, and a mirroring request regarding an execution result of the application, wherein the application is executed based on the information regarding the object, and mirroring the execution result of the application onto the sink device, via the communication unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5B is an operation flowchart illustrating a method in which a sink device provides a service by using a second source device, according to an embodiment of the present disclosure;

FIGS. 6A, 6B, and 6C are views illustrating an embodiment of a sink device providing a service by using a second source device, according to an embodiment of the present disclosure;

Throughout the drawings, it should be noted that like reference numbers are used to depict the same or similar elements, features, and structures.

DETAILED DESCRIPTION

Figure 1:
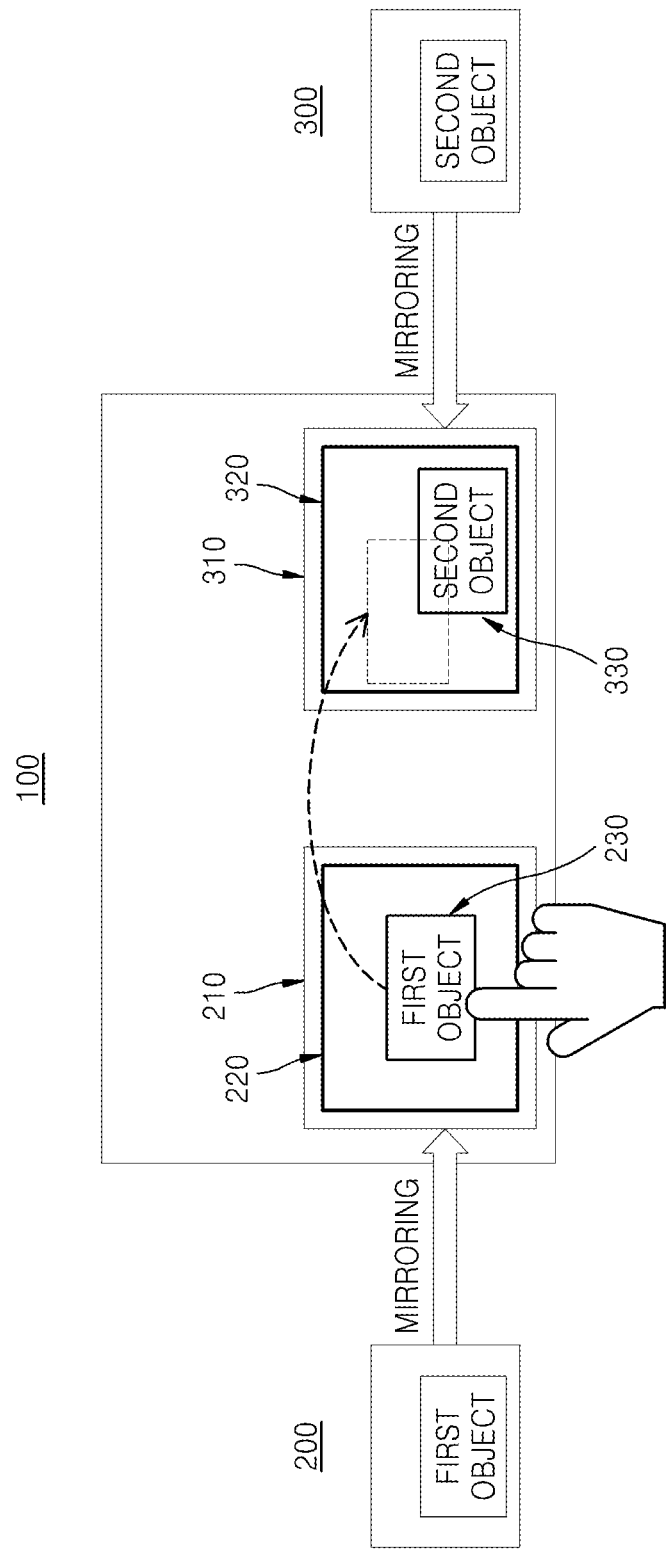
FIG. 1 is a conceptual view illustrating a method in which a sink device provides a service related to a plurality of mirroring images, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used in the present description will be briefly described, and embodiments of the present disclosure will be described in detail.

The terms used in the embodiments of the present disclosure are selected as general terms used currently as widely as possible, but in specific cases, terms arbitrarily selected by the applicant are also used, and in such cases the meanings are mentioned in the corresponding detailed description section, so the present disclosure should be understood not by literal meanings of the terms but by given meanings of the terms.

It will be further understood that the terms "comprises" and/or "comprising" used herein specify the presence of stated features or components, but do not preclude the presence or addition of one or more other features or components. In addition, the terms such as "unit" "-er(-or)," and "module" described in the specification refer to an element for performing at least one function or operation, and may be implemented in hardware, software, or the combination of hardware and software.

In providing a mirroring service, a screen that is displayed on a source device is transmitted by the source device to a sink device, and the sink device receives and displays the displayed screen.

Hereinafter, the source device indicates a device providing an image, and the sink device indicates a device receiving the image.

A plurality of devices that use the mirroring service may be connected 1:1, 1:N, or N:N, where N is the number of devices, and thus execute mirroring. Of course, the number of sink devices need not necessarily be the same as the number of source devices. At least one source device and at least one sink device may be connected to each other according to various communication network standards such as a Local Area Network (LAN), a Wide Area Network (WAN), a Wireless LAN (WLAN; Wi-Fi), Wireless Broadband (WiBro), Code Division Multiple Access (CDMA), Wideband CDMA (WCDMA), Near Field Communication (NFC), and the like.

An "object" in the present description is displayed on a device and may be operated or defined by a user. For example, the object may include an application, an application execution image, an execution window of an application, contents, a person or item shown on a contents execution image, an icon shown on the application execution image, or the like. An "application" is a program that receives a predetermined input from the device and outputs a predetermined result. The "contents" are files such as image files, video files, text files, etc. and are executable by using a predetermined application. The "person," "item," and "icon" respectively are a person, an item, and an icon that are displayed on a screen of the device by executing the contents or the application.

In the present description, if the object is an application execution image, information regarding the object (hereinafter, referred to as object information) may include a name of the application (Google Maps, Google Player, etc.), details of a service provided by the application (map search service, reproduction of contents, etc.), an input format of the application (file format, file size, etc.), identification information of the application, and the like which the device may use to distinguish the application from other applications. If the object is contents, the object information may include a name, an access Uniform Resource Locator (URL) address, a file format, a file size, and the like, of the contents. If the object is a person or item shown on the contents execution image, the object information may include a name or a type of the item or a name of the person. If the object is an icon shown on the application execution image, the object information may include a symbolic meaning of the icon, or contents that are executed when the icon is selected.

Reference will now be made in detail to embodiments, examples of which are illustrated in the accompanying drawings, wherein the like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a conceptual view illustrating a method in which a sink device provides a service related to a plurality of mirroring images, according to an embodiment of the present disclosure.

Referring to FIG. 1, the sink device 100 renders a video stream received from a first source device 200 in a first mirroring region 210, and thus displays the rendered stream as a first mirroring image 220. The sink device 100 renders a stream received from a second source device 300 in a second mirroring region 310, and thus displays the rendered stream as a second mirroring image 320.

According to a user input, the sink device 100 may determine an object in the first mirroring image 220 or the second mirroring image 320.

For example, when there is a user's touch input for selecting an object in the first mirroring image 220, the sink device 100 may determine an image that corresponds to a location touched by the user as a first object 230 that is selected in the first mirroring image 220. In this case, the location touched by the user is in the first mirroring image 220 that is displayed at a time point when there is the user's touch input for selecting an object.

Also, when there is a user's touch input for selecting an object on the second mirroring image 320, the sink device 100 may determine an image that corresponds to a location touched by the user as a second object 330 that is selected on the second mirroring image 320. In this case, the location touched by the user is on the second mirroring image 320 that is displayed at a time point when there is the user's touch input for selecting an object.

When the first object 230, selected in the first mirroring image 220 according to the user input, is moved to a location in the second mirroring image 320, the sink device 100 may determine an image that corresponds to the location to which the first object has been moved as the second object 330 that is selected on the second mirroring image 320.

The sink device 100 may provide a service based on information regarding the first and second objects 230 and 330.

When the first object 230 is contents, a person, an item, or an icon, and the second object 330 is an application, the sink device 100 may provide a service related to the contents, the person, the item, or the icon by executing the application.

For example, if the first object 230 is a certain person and the second object 330 is an application providing a search service, the sink device 100 may provide a search result regarding the certain person.

If the first object 230 is a video file and the second object 330 is a Social Networking Service (SNS) message board, the sink device 100 may upload the video file onto the SNS message board.

If the first object 230 is a playlist of audio sounds that may be selected and the second object 330 is an audio player, the sink device 100 may reproduce a selected audio sound by using a selected audio player.

When the first and second objects 230 and 330 are contents, a person, an item, or an icon, the sink device 100 according to an embodiment of the present disclosure may provide a service based on information regarding the first and second objects 230 and 330.

For example, if the first object 230 selected in the first mirroring image 220 is a video file advertising a restaurant, and the second object selected on the second mirroring image 320 is a video file regarding travelling, the sink device 100 may provide an advertisement video file related to a restaurant nearby a travelling site.

A service that is related to an object may be matched to the object depending on a name, a type, and properties of the object, and stored in advance. Therefore, when the user selects an object, a service related to the selected object may be determined.

When an object selection input is received from the user, in order to perform the above-described embodiments, the sink device 100 determines an object based on the user's touch input, determines a service related to the determined object, and provides the determined service.

Figure 2:
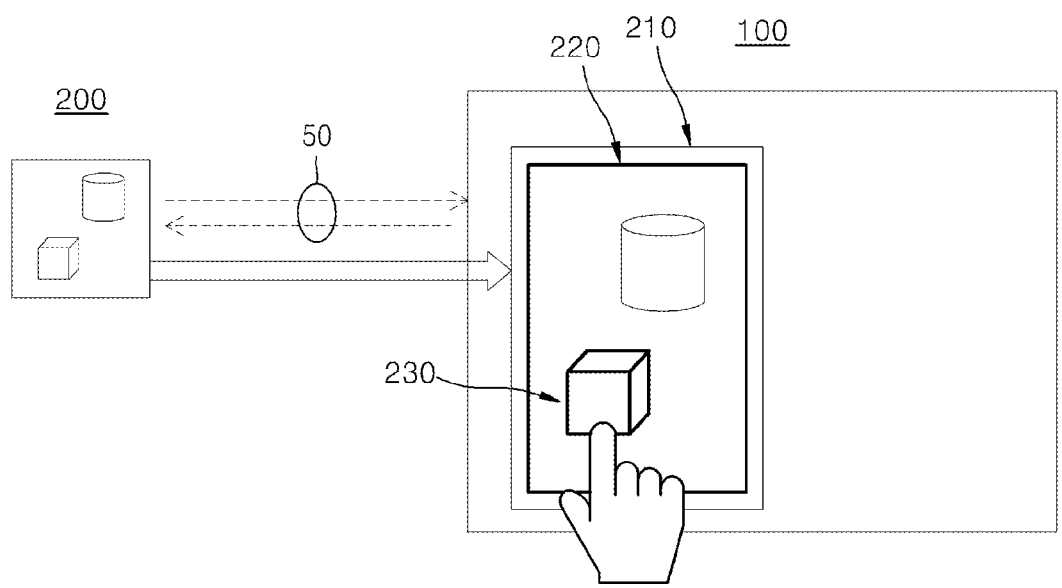
FIG. 2 is a view illustrating a method in which a sink device determines an object in a mirroring image displayed on a screen of the sink device based on a user input, according to an embodiment of the present disclosure.

FIG. 2 is a view illustrating a method in which a sink device determines an object in a mirroring image based on the user input, according to an embodiment of the present disclosure.

Referring to FIG. 2, when the user's touch input is received, the sink device 100 according to an embodiment of the present disclosure may request object information from the source device 200.

For example, if the user touches the mirroring image 220, that is, when the sink device 100 requests for object information from the source device 200, the source device 200 may respond to the request by transmitting a name, a type, and an input value format (for example, types of video files) of an application that is being executed at a time point when the request for the object information is received from the sink device 100, to the sink device 100.

Thus, the sink device 100 may determine that the application being executed in the source device 200 at the time point when the user's touch input is received, is the object 230.

In addition, when the user's touch input is received, the sink device 100 may transmit information regarding coordinates corresponding to the user's touch input to the source device 200, and may request the object information from the source device 200.

For example, when there is the request for the object information, the source device 200 may respond to the request by transmitting the object information to the sink device 100 at a time point of the request. The object information includes a name, a type, and an input value format (for example, types of video files) of an application that is being executed at a location that corresponds to the coordinates corresponding to the user's touch input that are received from the sink device 100.

Alternatively, when there is the request for the object information, the source device 200 may respond to the request by transmitting information regarding a video file that is being reproduced at a location that corresponds to the received coordinates, or information regarding an item or a person that is located at the location that corresponds to the received coordinates, to the sink device 100 at the time point of the request.

Therefore, at the time point when the user's touch input is received, the sink device 100 may extract the application, contents, or the item that corresponds to the coordinates corresponding to the user's touch input and are being executed in the source device 200, as the object 230.

According to an embodiment of the present disclosure, in order to obtain the object information, the sink device 100 may transmit a frame number, a timestamp value, and/or coordinates corresponding to a touched location of the first mirroring image that is displayed at the time point when there is the user's touch input, to the source device 200. Then, the sink device 100 may obtain the object information that corresponds to a frame touched by the user and the coordinates corresponding to the user's touch input from the source device 200.

The frame number is a unique number that shows a location of a frame in a mirroring stream. The timestamp value indicates a relative reproduction time point of a single frame; a single frame may have a single timestamp value.

To do so, when encoding a screen or sounds of the source device 200, the source device 200 may store the object information according to the frame number or the timestamp value.

For example, when encoding the screen or the sounds, the source device 200 may store, in a separate storage space, an area (for example, an application execution area or a contents display area) or details (for example, a URL address to the contents) of the object 230 displayed on the screen according to the frame number or the timestamp value.

When the source device 200 receives the request for the object information from the sink device 100, the source device 200 may respond to the request by transmitting the object information, which corresponds to the received frame number, the received timestamp value, and/or the information regarding the coordinates, to the sink device 100.

Thus, the sink device 100 may select the object 230 based on the object information received from the source device 200.

In the various embodiments described above, the request for the object information which includes the frame number, the timestamp value of the frame, and/or the information regarding coordinates, and the response to the request, may be transmitted and received via a channel 50 other than a video stream channel or an audio stream channel for mirroring.

According to an embodiment of the present disclosure, the sink device 100 may obtain the object information in a frame from metadata of a video frame or an audio frame that is received from the source device 200.

For example, the sink device 100 may obtain the object information in the video frame or the audio frame from a metadata frame having the same timestamp value as a timestamp value of the video frame or the audio frame.

In this regard, when generating a mirroring stream, the source device 200 may encode the object information in the video frame or the audio frame as the metadata frame having the same timestamp value as the timestamp value of the video frame or the audio frame, and thus generate a metadata stream. Also, the source device 200 may multiplex the metadata stream with a video stream or an audio stream.

Therefore, when there is the user's touch input, from a metadata frame having the same timestamp value as a timestamp value of a frame touched by the user, the sink device 100 may extract the object information included in an area touched by the user.

According to an embodiment of the present disclosure, other than the video stream or the audio stream that is received from the source device 200, the sink device 100 may receive a screen description stream and an object description stream, which both describe the object information, and thus obtain the object information in a frame that is selected by the user.

The screen description stream and the object description stream may be streams that are defined by MPEG-4 Binary Format for Scene (BIFS) that defines a binary format for 2-dimensional (2D) or 3-dimensional (3D) audio/video content. A screen description describes a space-time relationship between media objects in the screen. An object description includes information regarding respective properties of the objects, and connects each of the objects to a video stream or an audio stream. Therefore, the user may control the object that is selected when reproducing a mirroring stream.

In this regard, when encoding a screen or sounds, the source device 200 separates each object in the screen and the sounds (for example, an application, an image file, a video file, a text file, an item), and encodes the separated objects as the object description stream and the screen description stream. The object description stream may include object contents information that may store information that explains the object. The object contents information may include a type, a category, an explanation, and the like, of the object.

Therefore, the sink device 100 may separate each of the objects from the transmitted screen description stream and the transmitted object description stream; decode the separated objects; extract an object selected by the user during a mirroring service; and obtain the object information such as a type, a category, a description, and the like, of the object, from the object contents information of the extracted object.

When there is the user's touch input, the sink device 100 may determine not only the object 230 corresponding to touch coordinates, but also the mirroring image 220 as a whole, as an object.

Figure 3A:
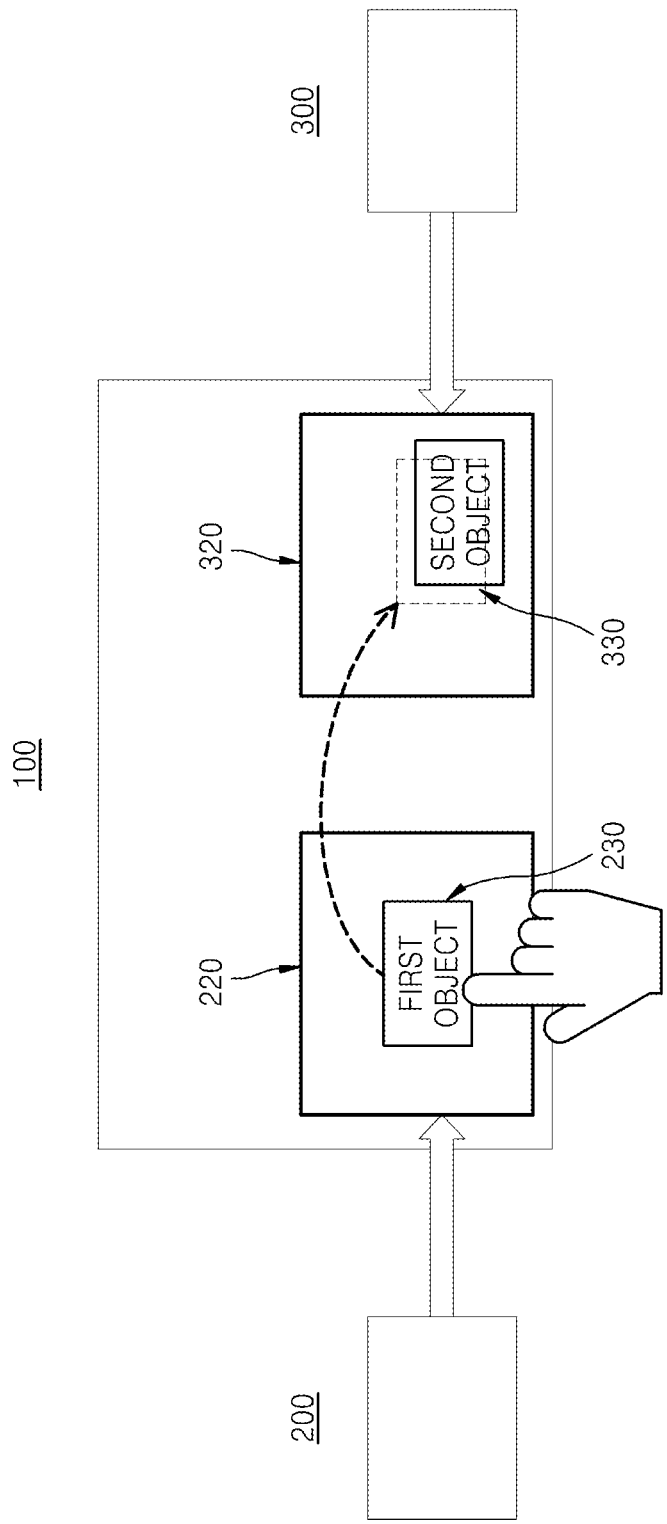
FIG. 3A is a view illustrating a method in which a sink device receives a user input for selecting an object, according to an embodiment of the present disclosure.

FIG. 3A is a view illustrating a method in which a sink device receives a user input for selecting an object, according to an embodiment of the present disclosure.

Referring to FIG. 3A, the sink device 100 may receive a selection input regarding the first object 230 in the first mirroring image 220 from the user.

As described with reference to FIG. 2, when there is the user's touch input on the first mirroring image 220, the sink device 100 may determine the first object 230 based on coordinates corresponding to the user's touch input on the first mirroring image 220.

Also, when the user touches the first object 230 and then drags and drops the first object 230 from the first mirroring image 220 to the second mirroring image 320, the sink device 100 may select an object that corresponds to the drop location in the second mirroring image 320 as the second object 330.

Figure 3B:
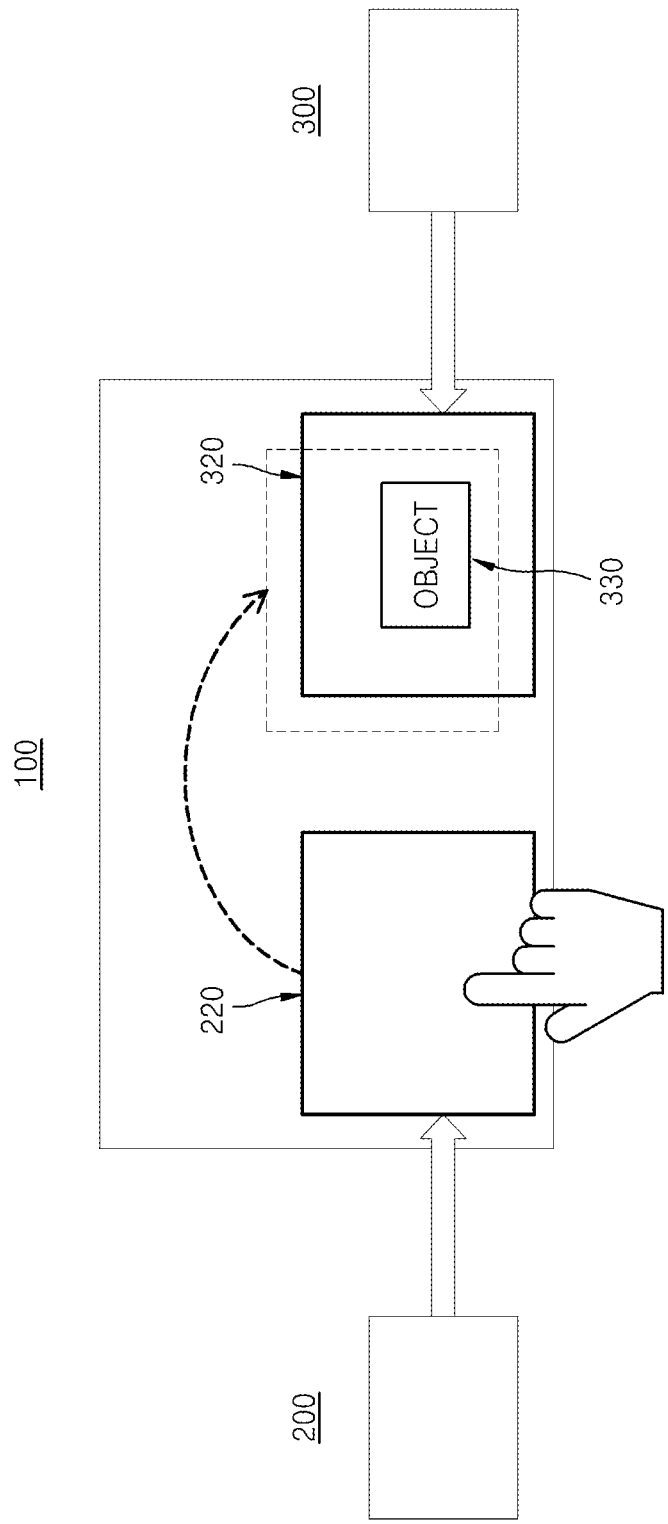
FIG. 3B is a view illustrating a method in which a sink device receives a user input for selecting an object, according to an embodiment of the present disclosure.

FIG. 3B is a view illustrating a method in which a sink device receives a user input for selecting an object, according to an embodiment of the present disclosure.

Referring to FIG. 3B, the sink device 100 may receive a user input for selecting an object in the first mirroring image 220. The object that is selected by the user's touch input may not be an object that only corresponds to a location of a user's touch input, but an object that may be extracted from the first mirroring image 220.

For example, when a music list is included in a mirroring image, a plurality of music files included in a mirroring image may all be selected as one object. Alternatively, when a plurality of items are included in a frame, the plurality of the items may all be selected as an object.

Figure 4:
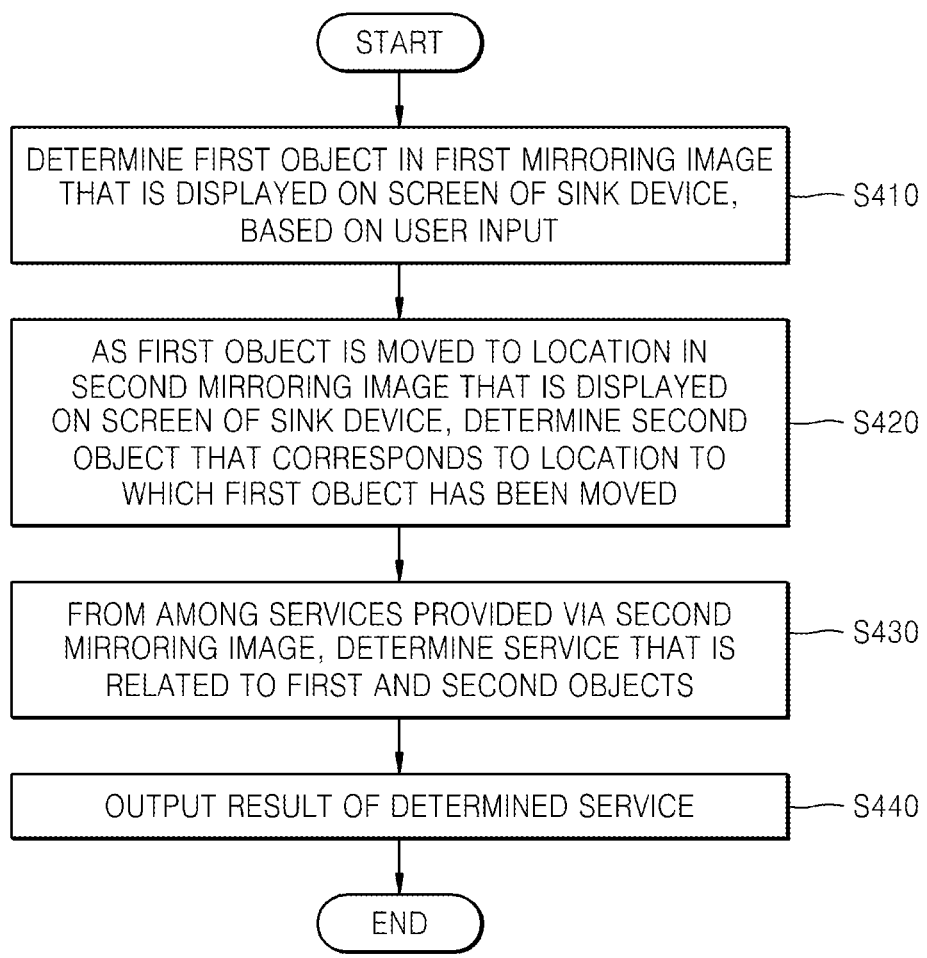
FIG. 4 is a flowchart illustrating a method in which a sink device provides a service related to the plurality of mirroring images based on a user input, according to an embodiment of the present disclosure.

FIG. 4 is a flowchart illustrating a method in which a sink device provides a service related to a plurality of mirroring images based on a user input, according to an embodiment of the present disclosure.

Referring to FIG. 4, the sink device 100 determines a first object in a first mirroring image that is displayed on the screen of the sink device 100, based on the user input in operation S410.

The user input may include a touch input on a touch screen provided in the sink device 100.

As described in FIG. 2, the sink device 100 may obtain object information for selecting the first object, based on coordinates corresponding to the user's touch input on the touch screen provided in the sink device 100, a frame number at a time point when the user has touched the screen, metadata, a screen description, and the like.

The sink device 100 may determine the first object based on the obtained object information.

For example, when the object information for selecting the first object is a name of a certain item, the sink device 100 may determine the certain item as the first object. Also, when the object information is a title and a storage location of a certain video file, the sink device 100 may determine the certain video file as the first object.

The object information may include information regarding a plurality of objects. For example, when the user selects a certain item in the first mirroring image that is mirroring a video file, the object information may include information regarding the certain item and information regarding the video file.

Therefore, when information regarding the plurality of objects is received, the sink device 100 may display the received objects on the screen, and determine a single first object based on a user's selection. That is, the sink device 100 may determine which of the received objects displayed on the screen is selected by the user. Also, the sink device 100 may display information regarding the selected first object so as to provide the information to the user.

In operation S420, as the first object is moved to a location in a second mirroring image that is displayed on the screen of the sink device 100, the sink device 100 may determine a second object that corresponds to the location to which the first object has been moved.

For example, as described in FIG. 3A, when the user moves the first object by dragging and dropping the first object from the first mirroring image to the second mirroring image, the sink device 100 may determine the second object that corresponds to the location to which the first object has been moved.

On the other hand, when the user does not move the first object and instead selects a certain location in the second mirroring image, the sink device 100 may determine the second object that corresponds to the selected certain location.

Referring back to FIG. 2, the sink device 100 may obtain object information for selecting the second object, by using coordinates received according to the user's touch input or coordinates of the location to which the first object has been moved, a frame number at a time point when the first object has been moved, metadata, an object description, and the like.

The sink device 100 may determine the second object from the obtained object information.

For example, when the object information for selecting the second object is a name of a certain item, the sink device 100 may determine the certain item as the second object. Alternatively, when the object information is a title of a certain video file, the sink device 100 may determine that the certain video is the second object.

The sink device 100 may select a single object from among information regarding the plurality of objects, based on the user's selection. Therefore, when information regarding the plurality of objects is received, the sink device 100 may display the received objects on the screen, and may determine a single second object based on the user's selection.

In operation S430, the sink device 100 may determine a service that is related to the first and second objects.

According to an embodiment of the present disclosure, if the first object determined in operation S420 is at least one of contents, a person, an item, and an icon, and the second object is an application that is stored in the second source device 300, the sink device 100 may determine a service provided by the application, that is, the second object, as the service to be provided to the user.

According to an embodiment of the present disclosure, a service of an application, which is matched to at least one of the first and second objects that are determined in operation S420, and then is stored in the sink device 100, may be determined as the service to be provided to the user.

According to an embodiment of the present disclosure, based on at least one of the first and second objects that are determined in operation S420, a service that may be provided by a third device (i.e., one of a plurality of devices that are connected via a mirroring network), may be determined as the service to be provided to the user.

In operation S440, the sink device 100 outputs a result of the determined service.

The service may be provided by the sink device 100, the first source device 200, the second source device 300, or the third device that is one of the plurality of devices that are connected via the mirroring network.

Thus, the sink device 100 may transmit the determined service and the object information to the source devices or the third device that are connected via the mirroring network, and may request the source devices and the third device to mirror a result of the determined service.

Also, the sink device 100 may receive and output the result of the service from the source devices or the third device. The result of the service may be received by using the sink device 100 to mirror a screen or sounds that are displayed or reproduced in the source devices or the third device.

Figure 5A:
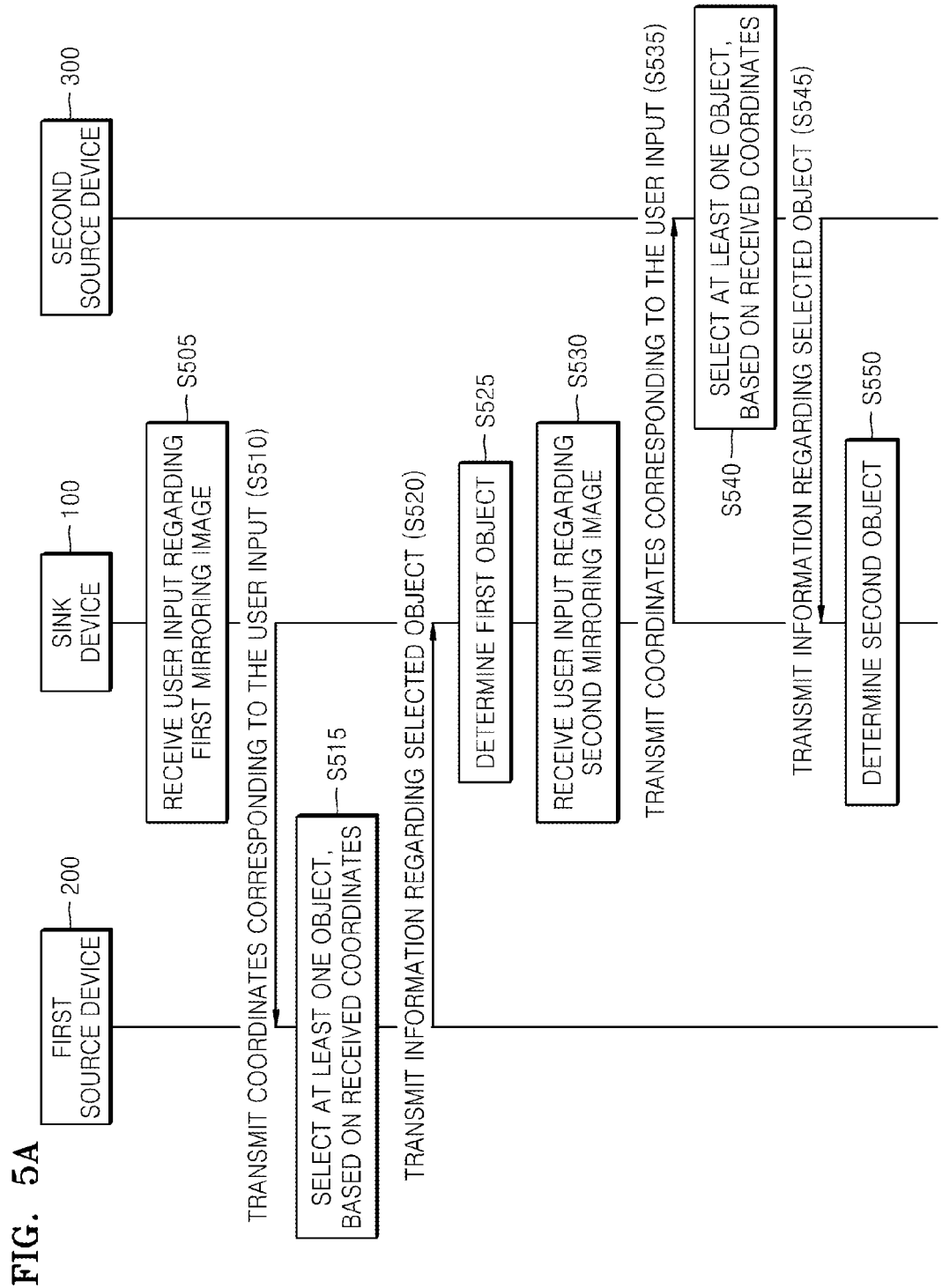
FIG. 5A is an operation flowchart illustrating a method in which a sink device determines an object based on a user's selection, according to an embodiment of the present disclosure.

FIG. 5A is an operation flowchart illustrating a method in which a sink device determines an object based on a user's selection, according to an embodiment of the present disclosure.

Referring to FIG. 5A, the sink device 100 receives the user input regarding the first mirroring image in operation S505. The user input may be a touch input, a gesture input, or an input using a joystick, a keyboard, or a remote control, but is not limited thereto.

In operation S510, the sink device 100 transmits coordinates corresponding to the user input to the first source device 200. With the coordinates corresponding to the user input, the sink device 100 may transmit a time point of the user input, a frame number or a timestamp value at the time point of the user input.

In operation S515, the first source device 200 selects at least one object, based on the received coordinates.

For example, the first source device 200 may select an item, an icon or the like that is located at the received coordinates as the object; or may select, as the object, all items, persons, icons, or the like in a frame at a time point when the coordinates are received. Also, the first source device 200 may select, as the object, contents that are reproduced in the first source device 200 at the time point when the coordinates are received.

In operation S520, the first source device 200 transmits information regarding the selected object to the sink device 100. At least one or more objects may be selected, and the information regarding the one or more selected objects may be transmitted.

In operation S525, the sink device 100 determines the first object, based on the object information received from the first source device 200.

For example, the sink device 100 may determine at least one first object, based on a name (for example, a name of an item or a person) or a type (for example, a type or a storage location of contents) of the selected object.

Alternatively, the sink device 100 may determine the first object based on the user input, such as a user's selection. When a plurality of objects are received, the sink device 100 may display a menu for selecting the plurality of objects on the screen, and determine the first object based on which of the plurality of objects is selected by the user.

In operation S530, the sink device 100 receives the user input regarding the second mirroring image. As described above, the user input may be a touch input, a gesture input, or an input using a joystick, a keyboard, or a remote control, but is not limited thereto. Also, a separate user input with respect to the second object may be made by the user, or the user may select the second object while using touch motions such as drag and drop to move the first object.

In operation S535, the sink device 100 transmits the inputted coordinates to the second source device 300. With the inputted coordinates, the sink device 100 may transmit a time point of the user input, or a frame number or a timestamp value at the time point of the user input.

In operation S540, the second source device 300 selects at least one object, based on the received coordinates.

For example, the second source device 300 may select an item, an icon, or the like that is located at the received coordinates as the object; or may select, as the object, all items, persons, icons, or the like in a frame at a time point when the coordinates are received.

In operation S545, the second source device 300 transmits information regarding the selected object to the sink device 100.

In operation S550, the sink device 100 determines the second object based on the object information that is received from the second source device 300. The method of the sink device 100 determining the second object includes the method of determining the first object, which is described in operation S525.

FIG. 5B is an operation flowchart illustrating a method in which a sink device provides a service by using a second source device, according to an embodiment of the present disclosure.

Referring to FIG. 5B, the sink device 100 determines the first and second objects in operation S555, which is the same as in FIG. 5A. Thus, detailed description thereof will be omitted.

In operation S560, by using the first object, the sink device 100 may determine a service that may be provided by an application that is installed in the second source device 300.

For example, if the first object that is determined in operation S555 is at least one of contents, a person, an item, or an icon; and the second object is the application that is executed in the second source device 300, the sink device 100 may determine to provide a service related to the application, that is, the second object.

For example, when the first object is a video file and the second object is a video player, the sink device 100 may determine to provide a service for reproducing the video file (the first object) by using the video player (the second object).

Also, the sink device 100 may select a service from among a plurality of services that may be provided by an application, based on the user input. For example, when the user selects a video file as the first object, and drags and drops the video file to an SNS application that is the second object, the sink device 100 may select a service that transmits the user-selected video file to a friend via the SNS, or upload the video on an SNS message board.

For example, when the first object is contents, the sink device 100 may determine whether or not it is possible to execute the contents (the first object) by using an application (the second object), and select a providable service.

For example, based on the object information sent from the second source device 300 to the sink device 100, the sink device 100 may receive a name of the application (Google Maps, Google Player, etc.), details of a service provided by the application (a map search service, reproduction of contents, etc.), an input format of the application (file format, file size, etc.), an Identification (ID) number of an application which the second source device 300 may use to distinguish the application from other applications, and an ID of a process that is being executed in the application of the second source device 300.

Accordingly, if a type or size of contents does not match the input format of the application, the sink device 100 may determine that the application is unable to provide a requested service. For example, if the contents include a video that requires a certain codec, but the application is a video player that does not have the certain codec, the sink device 100 may determine that the application may not provide the service.

In operation S565, the sink device 100 transmits an execution request regarding the application, which includes the information regarding the first object, to the second source device.

The sink device 100 may transmit the information regarding the first object to the second source device 300, and request the second source device 300 to execute the application related to the first object.

The information that the sink device 100 transmits to the second source device 300 may be necessary for the second source device 300 to execute the contents (the first object) by using the application (the second object).

For example, if the first object is contents, that is, files such as image files, video files, text files, etc., the sink device 100 may transmit information including details, keywords, a type, a size, or a URL address of the contents to the second source device 300. Also, if the second source device 300 has to directly request to the first source device 200 to execute the first object, the sink device 100 may transmit information such as identification information of a device that may access the first source device 200, to the second source device 300.

Also, the sink device 100 may transmit information related to the service, such as identification information (for example, an application ID) of an application that may execute the application (the second object), and identification information (for example, a process ID) of a process being executed in the application, to the second source device 300.

In operation S570, the second source device 300 executes the application that is requested with respect to the first object.

The second source device 300 may provide a service related to the first object, based on the information regarding the first and second objects, which is received from the sink device 100.

For example, the second source device 300 may directly control and execute the selected application. In order to directly control the selected application, the second source device 300 may store functions or executable files of applications that respectively correspond to certain services. Therefore, the second source device 300 may use the received information regarding the first object as a parameter value, load the functions or the executable file of the application, and thereby provide the services.

For example, if a received object is a name of a certain person, and a person search service, that is, a service that searches for a frame of a video in which the certain person appears has been requested, the second source device 300 may use the received name of the certain person as a parameter value, load functions or an executable file that corresponds to the service that searches for the certain person in the video, and provide the person search service.

Based on application identification information and identification information of the process of the application, which are received from the sink device 100, the second source device 300 may transmit an event for executing the object to the application or the process. For example, if the received object is a word in a text file and the selected service is a web search application, the second source device 300 may provide a web search service by transmitting the word and an event showing that the word has been input, to the web search application or the process that is being executed in the application.

In operation S575, the second source device 300 may transmit an execution result of the application related to the first object, to the sink device 100. The second source device 300 may encode the execution result of the application, that is, an execution image or sounds, and mirror the encoded execution result of the application, onto the sink device 100.

Therefore, the sink device 100 may provide the user-selected service onto the second mirroring image.

In operation S580, the sink device 100 may output the received execution result onto the second mirroring image.

Figure 6A:
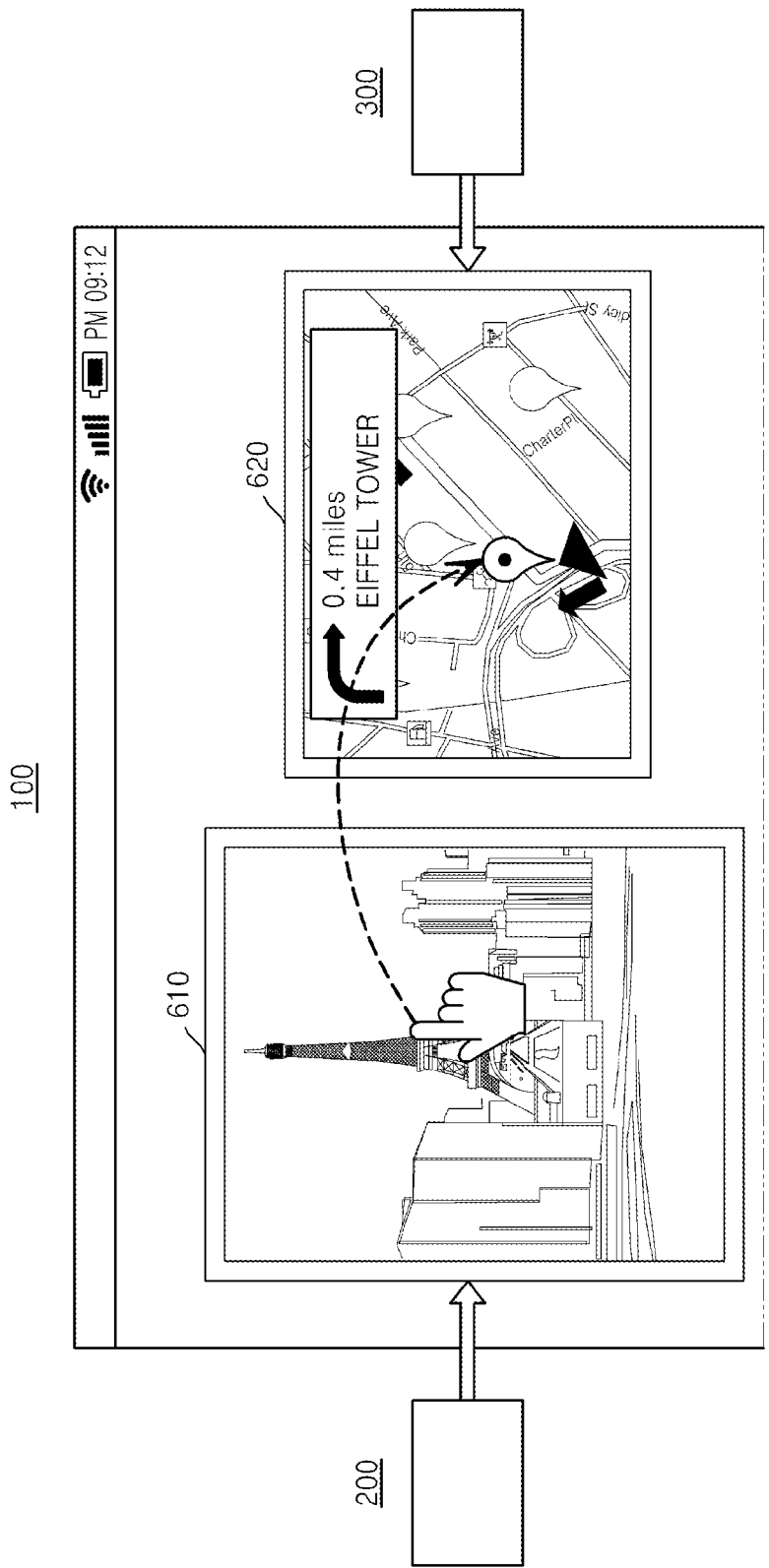
Figure 6B:
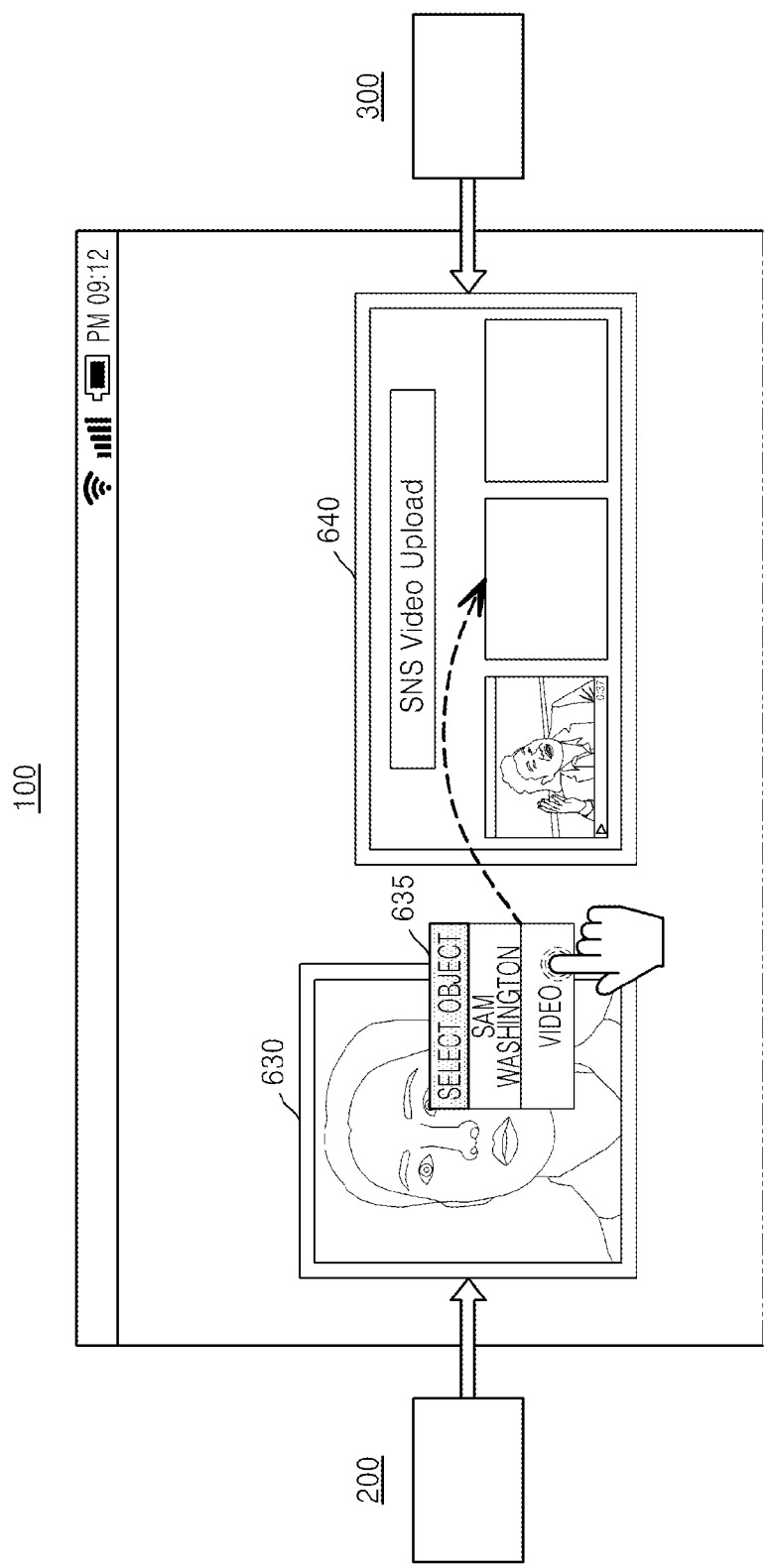

FIGS. 6A to 6C are views illustrating an embodiment of a sink device providing a service by using a second source device, according to an embodiment of the present disclosure.

Referring FIG. 6A, the sink device 100 mirrors an Eiffel tower image 610 from the first source device 200, and mirrors a navigation execution image 620 from the second source device 300. When the user touches, then drags and drops the Eiffel tower image 610 into the navigation image 620, the sink device 100 may provide a service that provides navigation directions to the Eiffel tower.

Specifically, the first object may be the Eiffel tower (item), and the second object may be a navigation application. Accordingly, from the first source device 200, the sink device 100 receives information regarding the first object, that is, "Eiffel tower (name)." From the second source device 300, the sink device 100 receives information regarding the second object, that is, identification information of the navigation application, such as a name or an ID of the application. The sink device 100 may determine to provide the user with the service that provides navigation directions to the Eiffel tower. The sink device 100 may request the second source device 300 to execute the navigation application that provides navigation directions to the Eiffel tower, receive a result of executing the navigation application, and provide the result to the user.

Referring to FIG. 6B, the sink device 100 mirrors a video 630 in which a certain person appears from the first source device 200, and mirrors an SNS application execution image 640 from the second source device 300. When the user touches, then drags and drops an image of a person in an image of the video 630 into the SNS application execution image 640, the sink device 100 may provide a service that uploads the video onto an SNS message board.

Specifically, the first object may be a video, and the second object may be an SNS application. Accordingly, from the first source device 200, the sink device 100 receives information regarding the first object, that is, a source (for example, a URL address for downloading the video, or identification information of the first source device 200 that is storing the video), a file format, a file size, and the like, regarding the video. From the second source device 300, the sink device 100 receives information regarding the second object, that is, identification information of the SNS application, such as an application name or an application ID. Then, the sink device 100 may determine to provide the service that uploads the video onto the SNS message board. The sink device 100 may request the second source device 300 to upload the video, receive an execution result, and provide the execution result to the user.

Furthermore, from the object information received from the first source device 200, the sink device 100 may provide a plurality of objects to the user. In FIG. 6B, the sink device 100 may receive information regarding the certain person and the video from the object information, and the user may select the object 635 based on the object information.

Referring to FIG. 6C, the sink device 100 mirrors an Eiffel tower image 650 from the first source device 200, and mirrors a map execution image from 660 from the second source device 300. When the user touches, then drags and drops the Eiffel tower image 650 into the map execution image 660, the sink device 100 may provide a service that shows a map of an area around the Eiffel tower.

Specifically, the first object may be the "Eiffel tower," and the second object may be a map application. Accordingly, from the first source device 200, the sink device 100 receives information regarding the first object, that is, the Eiffel tower. From the second source device 300, the sink device 100 receives information regarding the second object, that is, identification information of the map application, such as an application name or an application ID. The sink device 100 may determine to provide the service that shows the map of the area around the Eiffel tower. The sink device 100 may request the second source device 300 to execute the map application that includes the map of the area around the Eiffel tower, receive a result of executing the map application, and provide the result to the user.

Furthermore, from the object information received from the first source device 200, the sink device 100 may provide a plurality of objects to the user. In FIG. 6C, the user may select the object 655 based on the object information.

In addition, the sink device 100 may mirror an image of a music list from the first source device 200, and mirror a music player execution image from the second source device 300. In this case, when the user touches, then drags and drops a song from the image of the music list into the music player execution image, the sink device 100 may provide a service that reproduces the song.

Also, the sink device 100 may mirror a playlist of audio sounds from the first mirroring image, and mirror an audio player from the second mirroring image. When the user selects an audio sound from among playlists in the first mirroring image, then drags and drops the selected audio sound onto a screen of the audio player, the sink device 100 may extract a title, a type, and a size of the audio sound from a stream that is received from the first source device 200; transmit the extracted information to the second source device 300; and thus request for reproduction of the selected sound.

Figure 7:
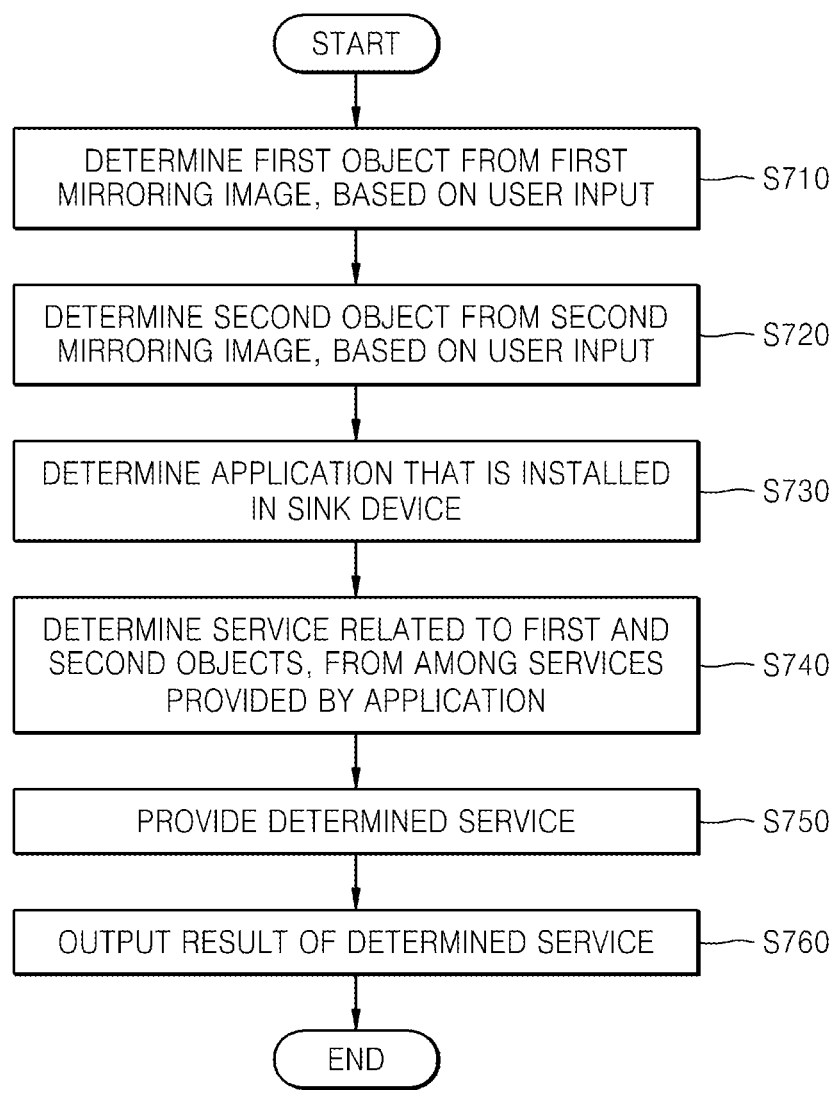
FIG. 7 is a flowchart illustrating a method in which a sink device provides a service by using an application installed in the sink device, according to an embodiment of the present disclosure.

FIG. 7 is a flowchart illustrating a method in which a sink device provides a service by using an application installed in the sink device, according to an embodiment of the present disclosure;

Referring to FIG. 7, the sink device 100 determines the first object from the first mirroring image that is displayed on the screen of the sink device 100, based on the user input in operation S710. In operation S720, as the first object is moved to a location in the second mirroring image that is displayed on the screen of the sink device 100 based on the user input, the sink device 100 determines the second object that corresponds to the location to which the first object has been moved. Since operations S710 and S720 are the same as operations S410 and S420 in FIG. 4, detailed descriptions thereof will be omitted.

In operation S730, the sink device 100 may determine an application that is installed in the sink device 100, based on the first and second objects.

The sink device 100 may store a list of applications that respectively match properties of objects, such as types or formats of the objects.

For example, if the first object or the second object is an e-mail address, a matching application may be an e-mail application. Alternatively, if the first object or the second object is a video, a matching application may be a video reproduction application or a contents copying application.

If there are a plurality of matching applications, the sink device 100 may select the application based on the user's selection.

In operation S740, the sink device 100 may determine a service related to the first and second objects, from among services provided by the application.

For example, if the first object is a file stored in the first source device 200, and the second object is a folder or a desktop screen stored in the second source device 300, the sink device 100 may determine to use a file copying service from a file-related application. If there are a plurality of providable services, the sink device 100 may determine which of the plurality of providable services to use based on the user's selection.

The sink device 100 may execute the application that is stored in the sink device 100, based on information that is recorded in a mirroring stream. For example, information (such as metadata) for executing a certain application in a frame of a certain video file or audio file may be included in a mirroring stream that is received by the sink device 100.

Therefore, when decoding the mirroring stream, the sink device 100 may execute the certain application in the frame of the certain video file or audio file. Also, when a mirroring process starts, the sink device 100 may transmit and receive information to and from a plurality of source devices such that data is shared between the sink device 100 and the plurality of devices.

In operation S750, the sink device 100 may provide the determined service. In operation S760, the sink device 100 may output a result of the determined service. In this case, the sink device 100 may output the result in a region of the screen of the sink device 100 other than a mirroring region.

Figure 8:
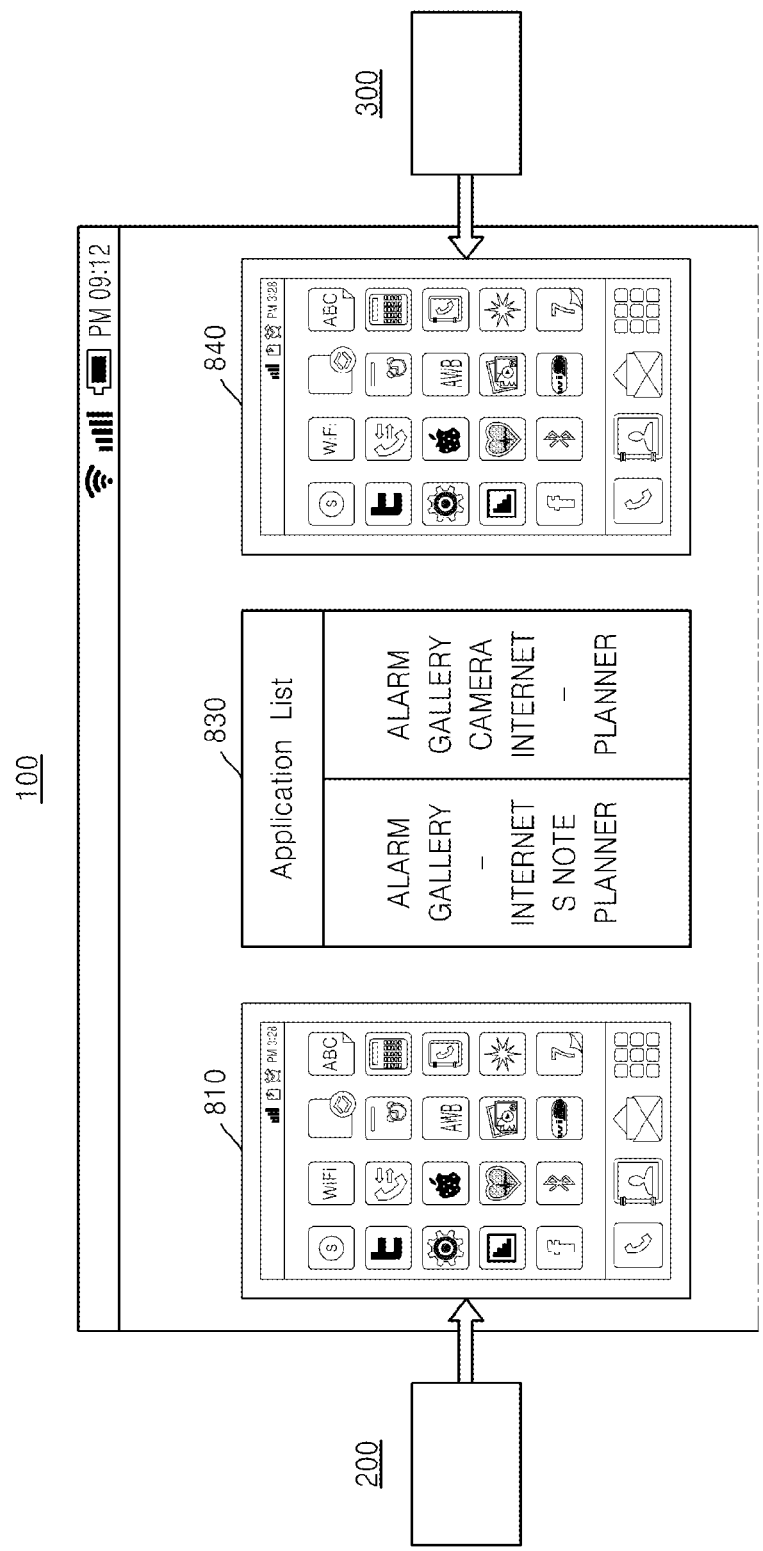
FIG. 8 is a view illustrating a method in which a sink device provides a service related to a mirroring image by using an application installed in the sink device, according to an embodiment of the present disclosure.

FIG. 8 is a view illustrating a method in which a sink device provides a service related to a mirroring image by using an application installed in the sink device 100, according to an embodiment of the present disclosure.

Referring to FIG. 8, the first object 810 is a main screen of icons of applications of the first source device 200, and the second object 840 is a main screen of icons of applications of the second source device 300. The sink device 100 may execute a pre-stored application that compares lists of applications, and thus provide a service 830 that compares the applications of the first and second source devices 200 and 300. In this case, when mirroring the main screen, the first and second source devices 200 and 300 may transmit information of the lists of the applications respectively listed the first and second devices 200 and 300, and the mirroring stream, to the sink device 100.

Figure 9:
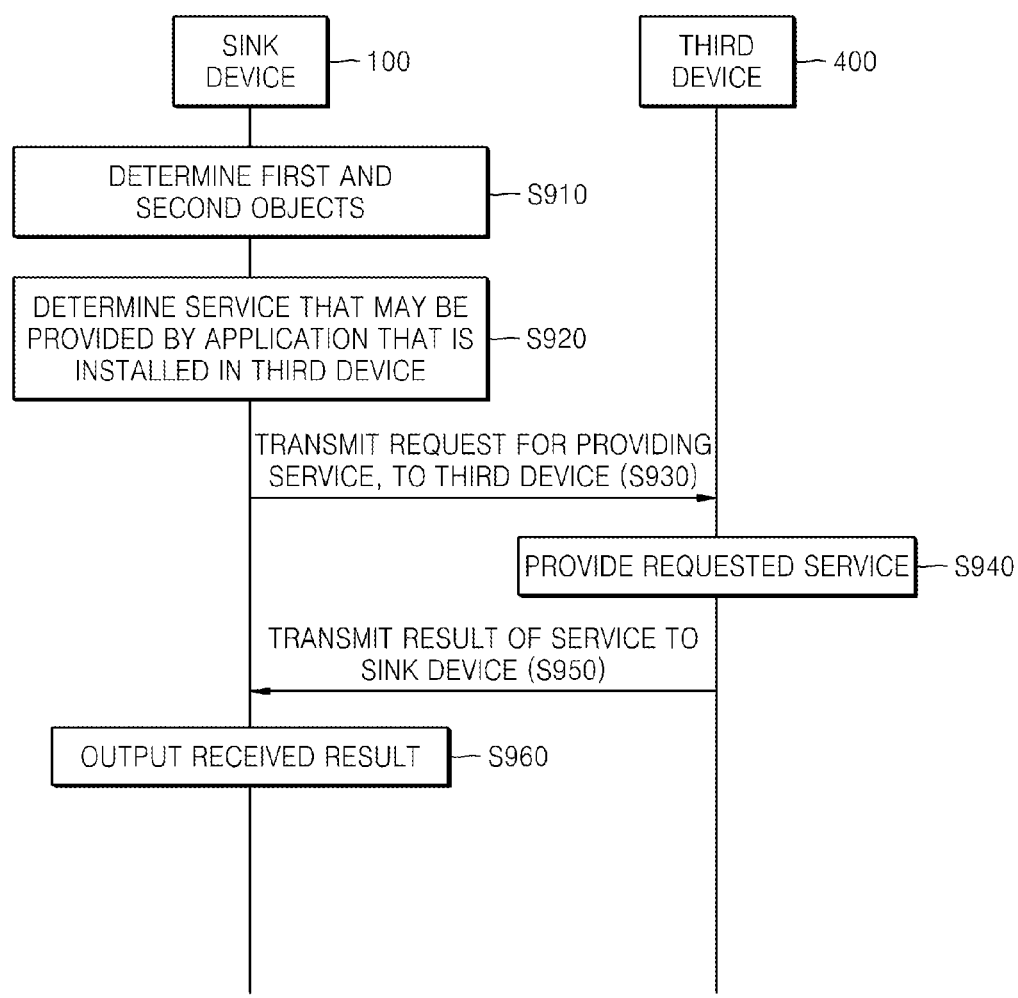
FIG. 9 is an operation flowchart illustrating a method in which a sink device provides a service by using a third device, according to an embodiment of the present disclosure.

FIG. 9 is an operation flowchart illustrating a method in which a sink device provides a service by using a third device, according to an embodiment of the present disclosure.

Referring to FIG. 9, the sink device 100 determines first and second objects in operation S910. Since operation S910 is the same as operation S555 of FIG. 5A, the detailed description thereof will be omitted.

In operation S920, the sink device 100 may determine a service that may be provided by an application that is installed in a third device 400, by using the first and second objects.

The third device 400 is a device in a mirroring network in which the sink device 100 and the first and second source devices 200 and 300 are included. The third device 400 includes a device that does not mirror its output to the sink device 100.

Referring back to FIG. 7, the sink device 100 may store a list of services that respectively match properties of objects, such as types or formats of the objects. Accordingly, the sink device 100 may determine a service that matches the first and second objects from among the list of services.

Also, the sink device 100 may obtain a list of services that are providable by the third device 400 and may provide a service from among the list of services according to the user's selection. For example, a plurality of devices that are included in the mirroring network may register a list of services that are providable by the plurality of devices, on a certain server or a certain device of the plurality of devices. From the certain server or the certain device, the sink device 100 may obtain the list of services that are providable by the plurality of devices in the same mirroring network. The sink device 100 may provide the obtained list of services to the user, receive a selection input from the user, and thus determine the service to provide to the user.

Therefore, when it is necessary to provide a web search service provided according to information regarding the first and second objects, the sink device 100 may determine a device that may provide the web search service, from the list of services stored in the certain server and the certain device.

The sink device 100 may receive a request for a service from the user, and thus request the devices that are included in the same mirroring network as the sink device 100 to indicate whether the devices are able to provide the service, or whether or not the devices are executing the application. According to responses from the devices regarding the request, the sink device 100 may request the service from a device that may provide the service.

In operation S930, the sink device 100 transmits a request for providing the service, which includes information regarding the first and second objects, to the third device 400.

In operation S940, the third device 400 provides the requested service.

In operation S950, the third device 400 transmits a result of the service to the sink device 100. The request for providing the service may include the mirroring request. Therefore, while providing the requested service, the third device 400 may encode an execution screen and sounds, and transmit in real-time the encoded execution screen and sounds to the sink device 100.

In operation S960, the sink device 100 outputs the received result. The sink device 100 may output a third mirroring image in a region of the source device other than the first and second mirroring regions.

Figure 10:
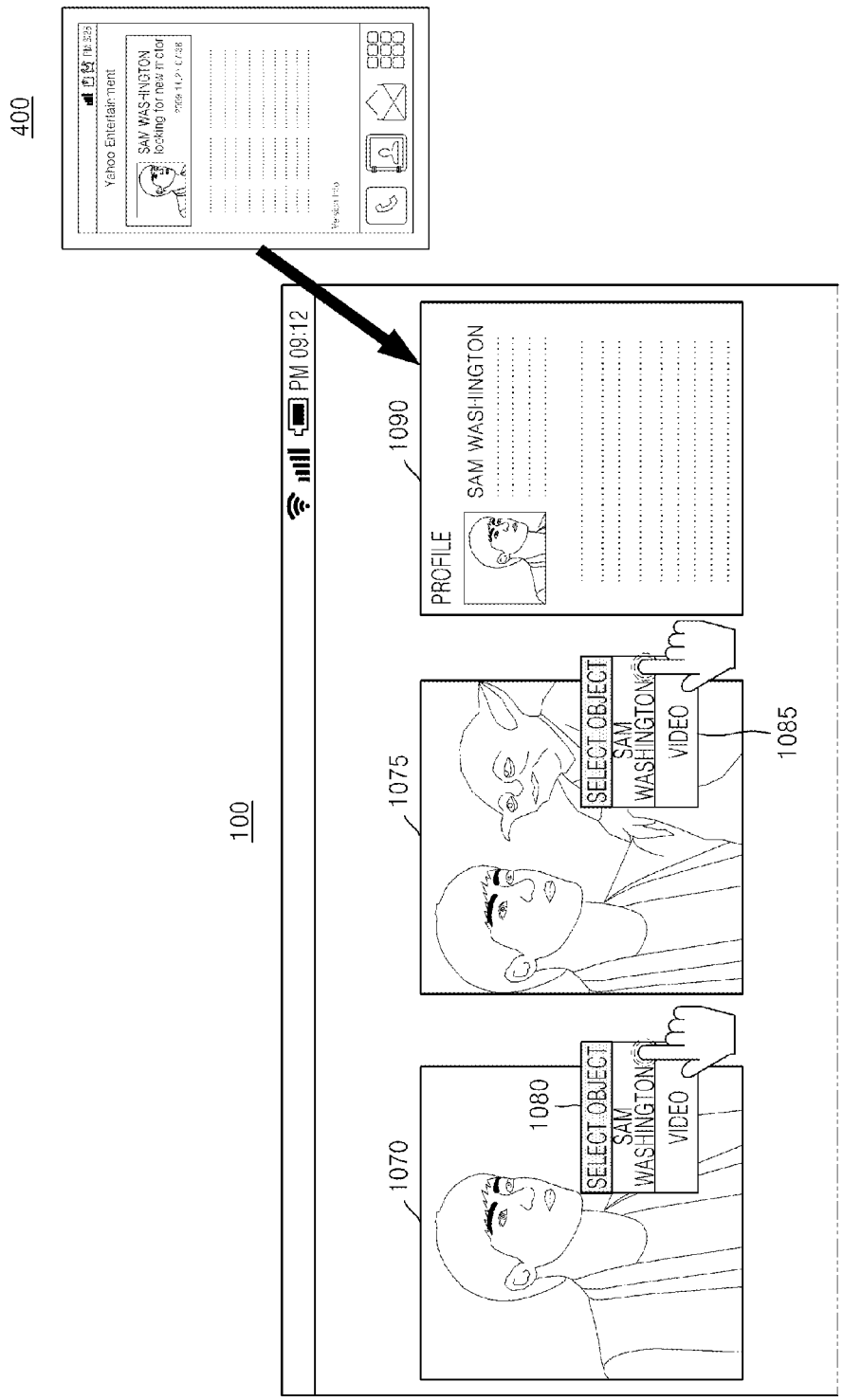
FIG. 10 is a view illustrating an embodiment of a sink device providing a service related to a mirroring image by using a third device, according to an embodiment of the present disclosure.

FIG. 10 is a view illustrating an embodiment of a sink device providing a service related to a mirroring image by using a third device, according to an embodiment of the present disclosure.

Referring to FIG. 10, the sink device 100 is mirroring a video onto a first mirroring image 1070 and a second mirroring image 1075. When the user selects the first mirroring image 1070, the sink device 100 may select the video and a person appearing in the video as an object, and provide a selection menu 1080 to the user. When the user selects the second mirroring image 1075, the sink device 100 may select the video and a person appearing in the video as another object, and provide a selection menu 1085 to the user.

When the user selects an image of a person named "Sam Washington" as first and second objects, the sink device 100 provides a person search service to the user, transmits information regarding the name "Sam Washington" to the third device 400, and thus request for the third device 400 to provide the person search service. The sink device 100 may receive a result of the person search service from the third device 400, and output the received result on a mirroring image 1090.

Figure 11:
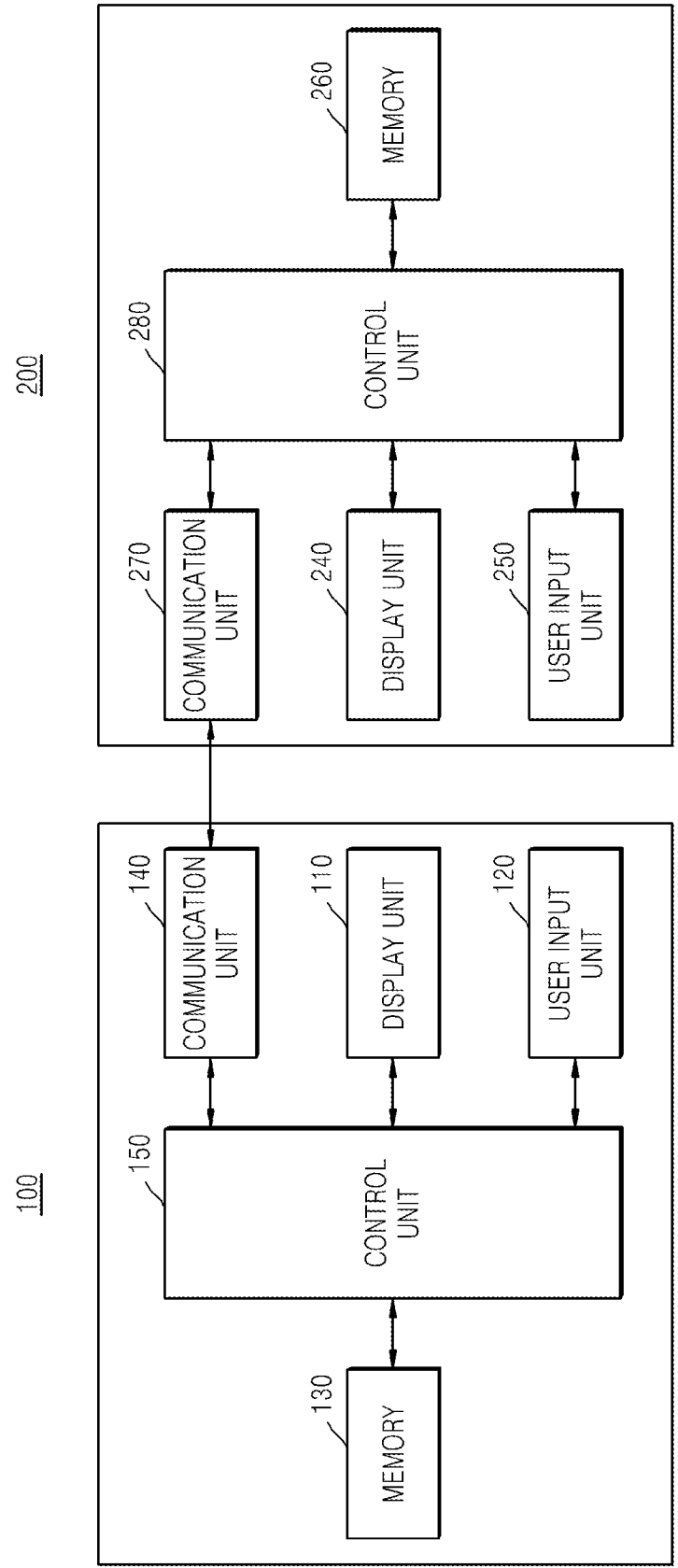
FIG. 11 is a block diagram of a sink device and a source device, according to an embodiment of the present disclosure.

FIG. 11 is a block diagram of a sink device and a source device, according to an embodiment of the present disclosure.

Referring to FIG. 11, the sink device 100 according to an embodiment of the present disclosure includes a display unit 110, a user input unit 120, a memory 130, a communication unit 140, and a control unit 150.

The display unit 110 is controlled by the control unit 150 so as to display a plurality of mirroring image on the screen of the sink device 100.

The user input unit 120 receives an input from the user of the sink device 100. The user may touch the screen of the sink device 100 or a button on the sink device 100, and thus the user input unit 120 may receive the user input.

The memory 130 stores data that is used by the sink device 100 to provide a service related to a plurality of mirroring images.

The communication unit 140 may transmit and receive data to and from an external apparatus (not shown) or an external server (not shown). The external apparatus provides a service which is mirrored onto a display of the sink device. The communication unit 140 may be connected 1:1 or 1:N with a plurality of source devices.

The control unit 150 controls operations of the sink device 100. Also, the control unit 150 controls the display unit 110, the user input unit 120, the memory 130, and the communication unit 140 so that the sink device 100 may provide the service related to the plurality of mirroring images.

The control unit 150 may determine the first object from the first mirroring image that is displayed on the screen of the sink device 100, based on the user input. Specifically, the control unit 150 may receive a touch input on the first mirroring image from the user, obtain information regarding at least one object that corresponds to coordinates of the touch input, and thus determine the first object based on the obtained information regarding the at least one object.

As the first object is moved to the second mirroring image that is displayed on the screen of the sink device 100, the control unit 150 may determine the second object that corresponds to a moving location of the first object.

The control unit 150 may determine a service related to the first and second objects, output a result of the determined service, and thus provide the service related to the plurality of mirroring images that are displayed on the screen of the sink device 100.

When the second object is an execution window of an application included in the second mirroring image, the control unit 150 may use the first object to determine a service that is providable by the application.

The control unit 150 may provide the service by transmitting an execution request regarding the application related to the first object, the application including first object information, to the second source device 300, receiving an execution result of the application from the second source device 300, and outputting the received execution result in a second region which displays the second mirroring image.

Alternatively, the control unit 150 may provide the service by transmitting a request regarding the service, which includes the first and second objects, to a third device, receiving a result of the service from the third device, and outputting the received result.

As illustrated in FIG. 11, the source device 200 according to an embodiment of the present disclosure includes a display unit 240, a user input unit 250, a memory 260, a communication unit 270, and a control unit 280.

The display unit 240 and the user input unit 250 respectively correspond to the display unit 110 and the user input unit 120 of the sink device 100. Thus, a detailed description thereof will be omitted.

The memory 260 stores data that is used by the source device 200 to provide a mirroring service to the sink device 100.

The communication unit 270 transmits and receives data used by the source device 200 to provide the mirroring service to the sink device 100, to and from an external apparatus (not shown) and an external server (not shown). The communication unit 270 may be connected 1:1 or 1:N with a plurality of sink devices.

The control unit 280 controls operations of the source device 200. Also, the control unit 280 controls the display unit 240, the user input unit 250, the memory 260, and the communication unit 270 so that the source device 200 may provide the mirroring service to the sink device 100.

Figure 12:
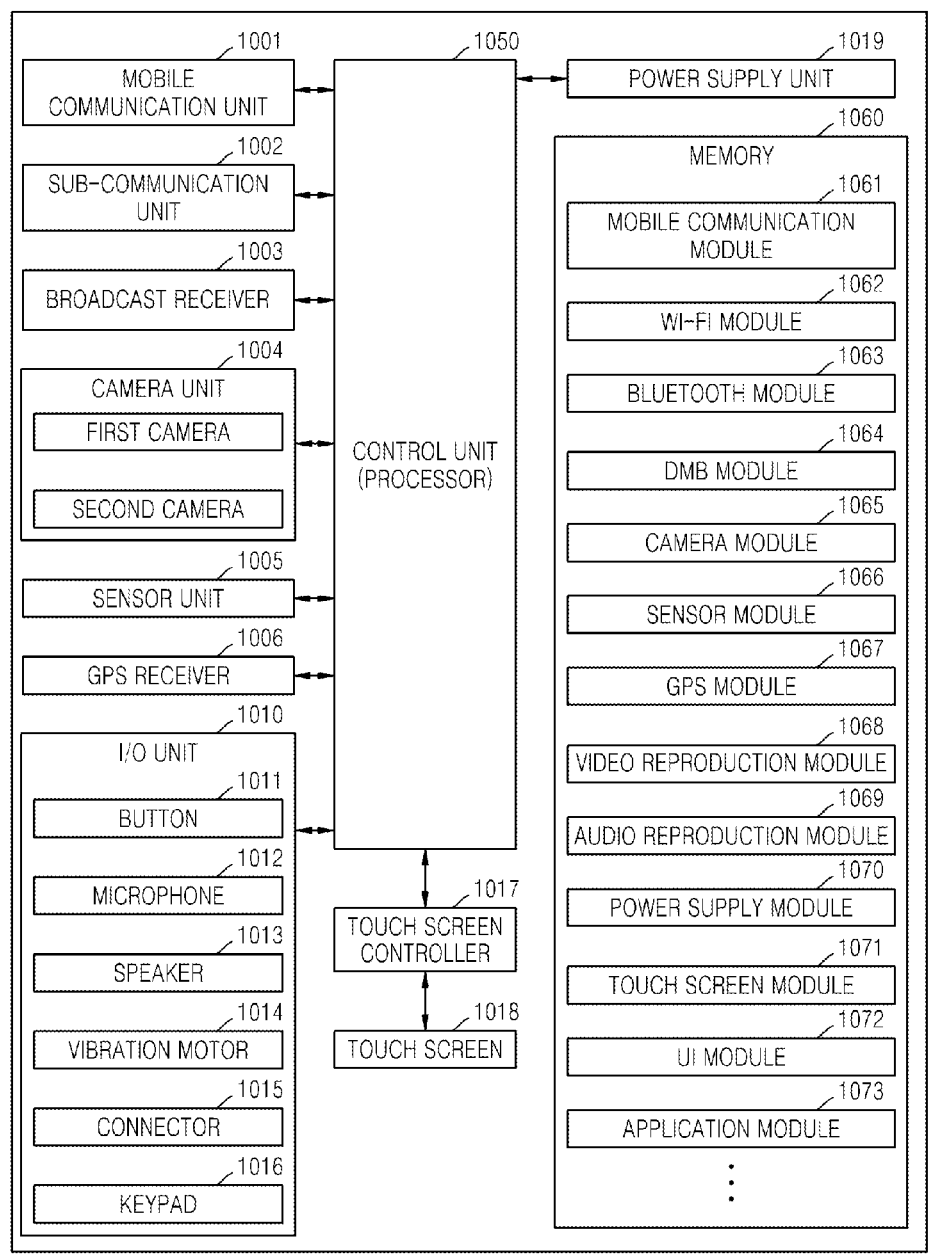
FIG. 12 is a block diagram of a sink device and a source device, according to an embodiment of the present disclosure.

FIG. 12 is a block diagram of a sink device and a source device, according to an embodiment of the present disclosure.

Referring to FIG. 12, a mobile communication unit 1001 may perform a call setup process, data communication, or the like, with a base station via a cellular network such as 3G/4G network. A sub-communication unit 1002 functions as a unit for local area communication, such as Bluetooth and NFC. A broadcast unit 1003 receives Digital Multimedia Broadcasting (DMB) signals.

A camera unit 1004 includes a lens and optical devices for capturing images or videos.

A sensor unit 1005 may include sensors such as a gravity sensor for detecting motions of a device 100, an illuminance sensor detecting brightness of light, a proximity sensor detecting proximity of a person, a motion sensor for detecting movements of a person, and the like.

A Global Positioning System (GPS) receiver 1006 receives GPS signals from satellites. Various services may be provided to the user by using the GPS signals.

An Input/Output (I/O) unit 1010 provides an interface for a person to interact with external devices, and includes a button 1011, a microphone 1012, a speaker 1013, a vibration motor 1014, a connector 1015, and a keypad 1016.

A touch screen 1018 receives a touch input of the user. A touch screen controller 1017 transmits the touch input that is input via the touch screen 1018, to a control unit 1050. A power supply unit 1019 is connected to a battery or an external power source so as to supply power to the device 1000.

Programs that are stored in a memory 1060 may be classified into a plurality of modules according to functions thereof. That is, the programs may be classified as a mobile communication module 1061, a Wi-Fi module 1062, a Bluetooth module 1063, a DMB module 1062, a camera module 1065, a sensor module 1066, a GPS module 1067, a video reproduction module 1068, an audio reproduction module 1069, a power supply module 1070, a touch screen module 1071, a User Interface (UI) module 1072, and an application module 1073. Respective functions of the modules may be intuitively understood by one of ordinary skill in the art from the respective names of the modules.

One or more embodiments of the present disclosure can be implemented through computer readable code/instructions, such as a computer-executed program module, in/on a medium, e.g., a computer readable medium. The computer readable medium may be a random computer-accessible medium, and may include volatile media, non-volatile media, separable media and/or non-separable media. Also, the computer readable medium may correspond to any computer storage media and communication media. The computer storage media includes volatile media, non-volatile media, separable media and/or non-separable media which are implemented by using a method or technology for storing information, such as computer readable code/instructions, data structures, program modules, or other data. The communication media generally includes computer readable code/instructions, data structures, program modules, or other transmission mechanisms, and random information transmission media.

It should be understood that the various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a sink device, the method comprising:
    determining a first object in a first mirroring image that is displayed on a screen of the sink device, based on a user input;
    linking, a second object determined in a second mirroring image that is displayed on the screen of the sink device, with the first object;
    determining an application related to the first object and the second object, from among applications installed in the sink device; and
    executing the determined application,
    wherein the determined application is different from a first application corresponding to the first object and a second application corresponding to the second object, and
    wherein the first mirroring image is mirrored by a first source device and the second mirroring image is mirrored by a second source device.

2. The method of claim 1, wherein the determining of the first object comprises:
    receiving the user input, wherein the user input is a touch input with respect to the first mirroring image;
    obtaining information regarding at least one object that corresponds to coordinates of the touch input; and
    determining the first object based on the obtained information regarding the at least one object.

3. The method of claim 2, wherein the obtaining of the information regarding the at least one object comprises:
    transmitting the coordinates of the touch input in a region where the first mirroring image is displayed, to the first source device that transmits the first mirroring image; and
    receiving, from the first source device, the information regarding the at least one object that corresponds to the coordinates of the touch input.

4. The method of claim 1, wherein the determining of the second object comprises:
    receiving the user input, wherein the user input is a touch input with respect to the second mirroring image;
    obtaining information regarding at least one object that corresponds to coordinates of the touch input; and
    determining the second object based on the obtained information regarding the at least one object.

5. The method of claim 1, wherein the second object comprises an execution window of an application that is included in the second mirroring image and installed in the second source device.

6. The method of claim 1, further comprising:
determining a service that is providable by the application,
wherein the executing of the determined application comprises executing the determined service.

7. The method of claim 1, wherein the executing of the determined application comprises:
transmitting a request regarding the determined application to a third device, wherein the request includes the first object and the second object;
receiving, from the third device, an execution result of the application related to the first object; and
outputting the received execution result.

8. A sink device for providing a service, the sink device comprising:
a memory configured to store at least one program; and
a processor configured to execute the at least one program so as to display an execution result,
wherein the at least one program comprises commands that when executed, control:
determining a first object in a first mirroring image that is displayed on the screen of the sink device, based on a user input;
linking, a second object determined in a second mirroring image that is displayed on the screen of the sink device, with the first object;
determining an application related to the first object and the second object, from among applications installed in the sink device; and
executing the determined application,
wherein the determined application is different from a first application corresponding to the first object and a second application corresponding to the second object, and
wherein the first mirroring image is mirrored by a first source device and the second mirroring image is mirrored by a second source device.

9. The sink device of claim 8, wherein the determining of the first object comprises:
receiving a touch input with respect to the first mirroring image from the user;
obtaining information regarding at least one object that corresponds to coordinates of the touch input; and
determining the first object based on the obtained information regarding the at least one object.

10. The sink device of claim 9, wherein the obtaining of the information regarding the at least one object comprises:
transmitting the coordinates of the touch input in a region where the first mirroring image is displayed, to the first source device that transmits the first mirroring image; and
receiving, from the first source device, the information regarding the at least one object which is selected based on the coordinates.

11. The sink device of claim 8, wherein the determining of the second object comprises:
receiving a touch input with respect to the second mirroring image from the user;
obtaining information regarding at least one object that corresponds to coordinates of the touch input; and
determining the second object based on the obtained information regarding the at least one object.

12. The sink device of claim 8, wherein the second object comprises an execution window of an application that is included in the second mirroring image and installed in the second source device.

13. The sink device of claim 8, further comprising:
determining a service that is providable by the application,
wherein the executing of the determined application comprises executing the determined service.

14. The sink device of claim 8, wherein the executing of the determined application comprises:
transmitting a request regarding the determined application to a third device, wherein the request includes the first object and the second object;
receiving, from the third device, an execution result of the application related to the first object; and
outputting the received execution result.

15. A method of providing a mirroring service to a sink device by a source device, the method comprising:
receiving, from the sink device:
information regarding one or more objects,
information regarding an application which is determined from among applications provided via the source device, the application being related to the one or more objects, and
a mirroring request regarding an execution result of the application, the application being executed based on the information regarding the one or more objects; and
mirroring the execution result of the application onto the sink device,
wherein the application is different from one or more applications, each of the one or more applications corresponding to each of the one or more objects.

16. The method of claim 15, wherein the application is selected by a user input while an execution screen of the application is displayed on the sink device.

17. The method of claim 15, further comprising:
receiving, from the sink device, coordinates that are input by a user into a mirroring image that outputs the execution result of the application;
selecting at least one object based on the coordinates; and
transmitting information regarding the selected at least one object, to the sink device.

18. A source device for providing a mirroring service, the source device comprising:
a communication unit configured to communicate with an external device;
a memory configured to store at least one program; and
a processor configured to execute the at least one program so as to display an execution result;
wherein the at least one program comprises commands that when executed, control:
receiving, from a sink device via the communication unit:
information regarding one or more objects,
information regarding an application which is determined from among applications provided via the source device, the application being related to the one or more objects, and
a mirroring request regarding an execution result of the application, the application being executed based on the information regarding the one or more objects; and
mirroring the execution result of the application onto the sink device, via the communication unit, wherein the application is different from one or more applications, each of the one or more applications corresponding to each of the one or more objects.

19. The source device of claim 18, wherein the application is selected by a user input while an execution screen of the application is displayed on the sink device.

20. The source device of claim 18, wherein the at least one program further comprises commands that when executed, control:
   receiving, from the sink device, coordinates that are input by a user into a mirroring image that outputs the execution result of the application;
   selecting at least one object based on the coordinates; and
   transmitting information regarding the selected at least one object, to the sink device.

* * * * *